United States Patent
Yuan et al.

(10) Patent No.: US 12,231,208 B2
(45) Date of Patent: Feb. 18, 2025

(54) DETERMINING UPLINK DEFAULT BEAM FOR MULTIPLE-INPUT MULTIPLE-OUTPUT (MIMO)

(71) Applicant: QUALCOMM Incorporated, San Diego, CA (US)

(72) Inventors: Fang Yuan, Beijing (CN); Yan Zhou, San Diego, CA (US); Wooseok Nam, San Diego, CA (US); Mostafa Khoshnevisan, San Diego, CA (US); Tao Luo, San Diego, CA (US); Xiaoxia Zhang, San Diego, CA (US); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/909,985

(22) PCT Filed: Apr. 8, 2020

(86) PCT No.: PCT/CN2020/083804
§ 371 (c)(1),
(2) Date: Sep. 7, 2022

(87) PCT Pub. No.: WO2021/203315
PCT Pub. Date: Oct. 14, 2021

(65) Prior Publication Data
US 2023/0101444 A1     Mar. 30, 2023

(51) Int. Cl.
H04B 7/0404     (2017.01)
H04B 7/06       (2006.01)

(52) U.S. Cl.
CPC ......... *H04B 7/0695* (2013.01); *H04B 7/0404* (2013.01)

(58) Field of Classification Search
CPC ................ H04B 7/0695; H04B 7/0404; H04B 2201/698; H04W 72/1268; H04W 72/21
See application file for complete search history.

(56) References Cited

U.S. PATENT DOCUMENTS 10,785,705 B1 *  9/2020  Rofougaran .......... H04W 48/16
11,490,403 B2 *  11/2022 Huang .................. H04W 72/23
(Continued)

FOREIGN PATENT DOCUMENTS

CN      108633075 A      10/2018
CN      109788564 A       5/2019
(Continued)

OTHER PUBLICATIONS

International Search Report and Written Opinion—PCT/CN2020/083804—ISA/EPO—Dec. 30, 2020.
(Continued)

*Primary Examiner* — Sophia Vlahos
(74) *Attorney, Agent, or Firm* — Patterson & Sheridan, L.L.P.

(57) ABSTRACT

Aspects of the present disclosure relate to wireless communications, and more particularly, to techniques for determining a default uplink beam to use for at least one configured uplink resource before receiving an uplink beam configuration, such as in New Radio multi-input multi-output applications.

16 Claims, 16 Drawing Sheets

1000

```
┌──────────────────────────────────────────────────┐ ─1002
│ DETERMINE A DEFAULT UPLINK BEAM TO USE FOR AT    │
│ LEAST ONE CONFIGURED UPLINK RESOURCE BEFORE      │
│ RECEIVING AN UPLINK BEAM CONFIGURATION           │
└──────────────────────────────────────────────────┘
                       │
                       ▼
┌──────────────────────────────────────────────────┐ ─1104
│ USE THE DEFAULT UPLINK BEAM FOR TRANSMITTING THE │
│ AT LEAST ONE CONFIGURED UPLINK RESOURCE AFTER    │
│ RECEIVING AN UPLINK BEAM CONFIGURATION UNTIL     │
│ DETECTING A CONDITION FOR DEACTIVATING THE       │
│ DEFAULT UPLINK BEAM                              │
└──────────────────────────────────────────────────┘
```

(56) References Cited

U.S. PATENT DOCUMENTS

| | | | | |
|---|---|---|---|---|
| 2013/0242761 | A1* | 9/2013 | Park | H04L 43/08 |
| | | | | 370/252 |
| 2015/0181589 | A1* | 6/2015 | Luo | H04L 5/001 |
| | | | | 370/329 |
| 2016/0142189 | A1* | 5/2016 | Shin | H04B 7/0626 |
| | | | | 370/329 |
| 2018/0212651 | A1* | 7/2018 | Li | H04B 7/0686 |
| 2018/0220398 | A1* | 8/2018 | John Wilson | H04B 7/0695 |
| 2019/0029046 | A1* | 1/2019 | Li | H04W 72/21 |
| 2019/0215136 | A1 | 7/2019 | Zhou et al. | |
| 2020/0196383 | A1 | 6/2020 | Tsai et al. | |
| 2021/0144703 | A1* | 5/2021 | Jung | H04B 7/0408 |
| 2021/0144720 | A1* | 5/2021 | Xu | H04W 80/02 |
| 2021/0185734 | A1* | 6/2021 | Li | H04W 74/0808 |
| 2021/0274487 | A1* | 9/2021 | Matsumura | H04B 7/088 |
| 2022/0183039 | A1* | 6/2022 | Matsumura | H04W 16/28 |
| 2022/0216929 | A1* | 7/2022 | Matsumura | H04W 52/242 |

FOREIGN PATENT DOCUMENTS

| | | | | |
|---|---|---|---|---|
| CN | 110636542 | A | 12/2019 | |
| CN | 111294177 | A * | 6/2020 | H04L 5/0005 |

OTHER PUBLICATIONS

Nokia, et al., "Enhancements on Multi-Beam Operation", 3GPP Draft, 3GPP TSG RAN WG1 #97 Meeting, R1-1907317, 3rd Generation Partnership Project (3GPP), Mobile Competence Centre, 650, Route Des Lucioles, F-06921, Sophia-Antipolis Cedex France, vol. RAN WG1, No. Reno, Nevada, USA, May 13, 2019-May 17, 2019, May 13, 2019 (May 13, 2019), XP051728756, 22 Pages, sections 2 and 3, paragraph [0002], the whole document.

NTT DOCOMO: "Remaining Issues on Beam Management", 3GPP TSG RAN WG1 Meeting #94, R1-1809138, Maintenance for Beam Management, 3rd Generation Partnership Project, Mobile Competence Centre, 650, Route Des Lucioles, F-06921, Sophia-Antipolis Cedex, France, vol. Ran WG1, No. Gothenburg, Sweden, Aug. 20, 2018-Aug. 24, 2018, Aug. 11, 2018, pp. 1-10, XP051516508, paragraph [03.1], figure 3, Section 2.2, p. 4.

Qualcomm Incorporated: "Beam Management for NR", 3GPP TSG RAN WG1 Meeting #92bis, R1-1804787, 3rd Generation Partnership Project, Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018, Apr. 7, 2018, 8 Pages, XP051427054, XP051414143, Section 14, Section 13 p. 5.

Sony: "Remaining Issues on Rel. 15 Beam Management", 3GPP TSG-RAN WG1 #94bis, R1-1810628, 3rd Generation Partnership Project, Mobile Competence Centre, 650 Route Des Lucioles, F-06921, Sophia-Antipolis Cedex France, vol. RAN WG1 No. Chengdu, China, Oct. 8, 2018-Oct. 12, 2018, Sep. 28, 2018, XP051518034, 5 Pages, Sections 2, 2.1, 2.2, p. 1-p. 3, the Whole Document.

Supplementary European Search Report—EP20930615—Search Authority—Munich—Dec. 22, 2023.

* cited by examiner

DETERMINING UPLINK DEFAULT BEAM FOR MULTIPLE-INPUT MULTIPLE-OUTPUT (MIMO)

CROSS-REFERENCE TO RELATED APPLICATIONS

This application is a national stage application under 35 U.S.C. 371 of PCT/CN2020/083804 filed Apr. 8, 2020, which is hereby expressly incorporated by reference herein in its entirety as if fully set forth below and for all applicable purposes.

INTRODUCTION

Aspects of the present disclosure relate to wireless communications, and more particularly, to determining a default uplink beam.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes determining a default uplink beam. The default uplink beam may be used for at least one configured uplink resource before receiving an uplink beam configuration. The method may further include using the default uplink beam for transmitting the at least one configured uplink resource after receiving an uplink beam configuration until detecting a condition for deactivating the default uplink beam.

Certain aspects of the present disclosure provide a method for wireless communications by a network entity. The method generally includes determining a default uplink beam for a UE to use for at least one configured uplink resource before the network entity sending the UE an uplink beam configuration. The method may further include processing transmissions from the UE sent on the configured uplink resource using the default uplink beam after sending the UE an uplink beam configuration until detecting a condition for deactivating the default uplink beam.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
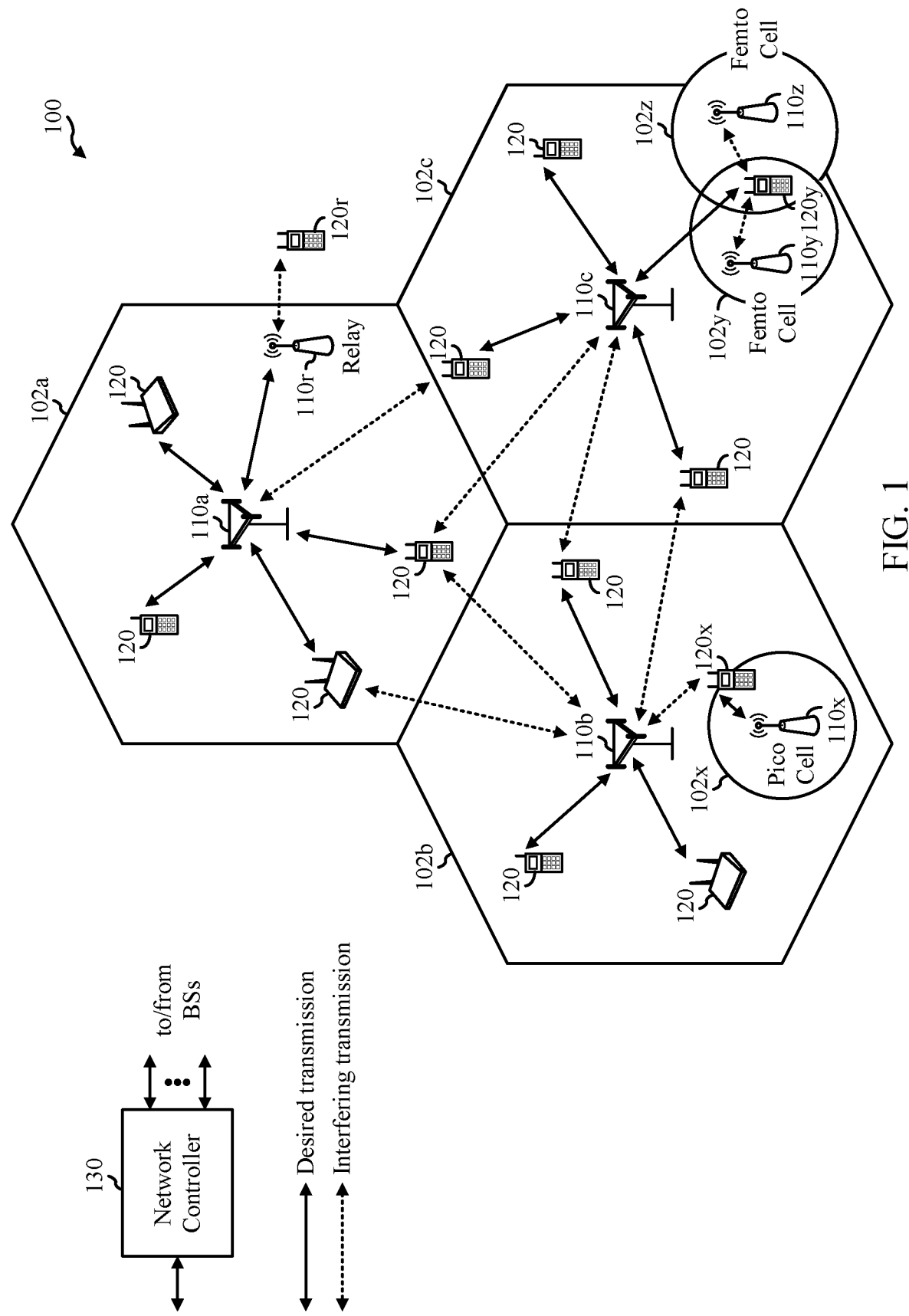
FIG. 1 is a block diagram conceptually illustrating an example telecommunications system, in accordance with certain aspects of the present disclosure.

Aspects of the present disclosure provide apparatus, devices, methods, processing systems, and computer readable mediums for determining a default uplink beam to use for at least one configured uplink resource before receiving an uplink beam configuration.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a user equipment (UE) 120 configured to perform operations 1000 of FIG. 10 to determine a default uplink beam to use for at least one configured uplink resource before receiving an uplink beam configuration. Similarly, the wireless network 100 may include a base station 110 configured to perform operations 1100 of FIG. 11 to determine a default uplink beam for the UE to use for at least one configured uplink resource before the network entity sends the UE an uplink beam configuration.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
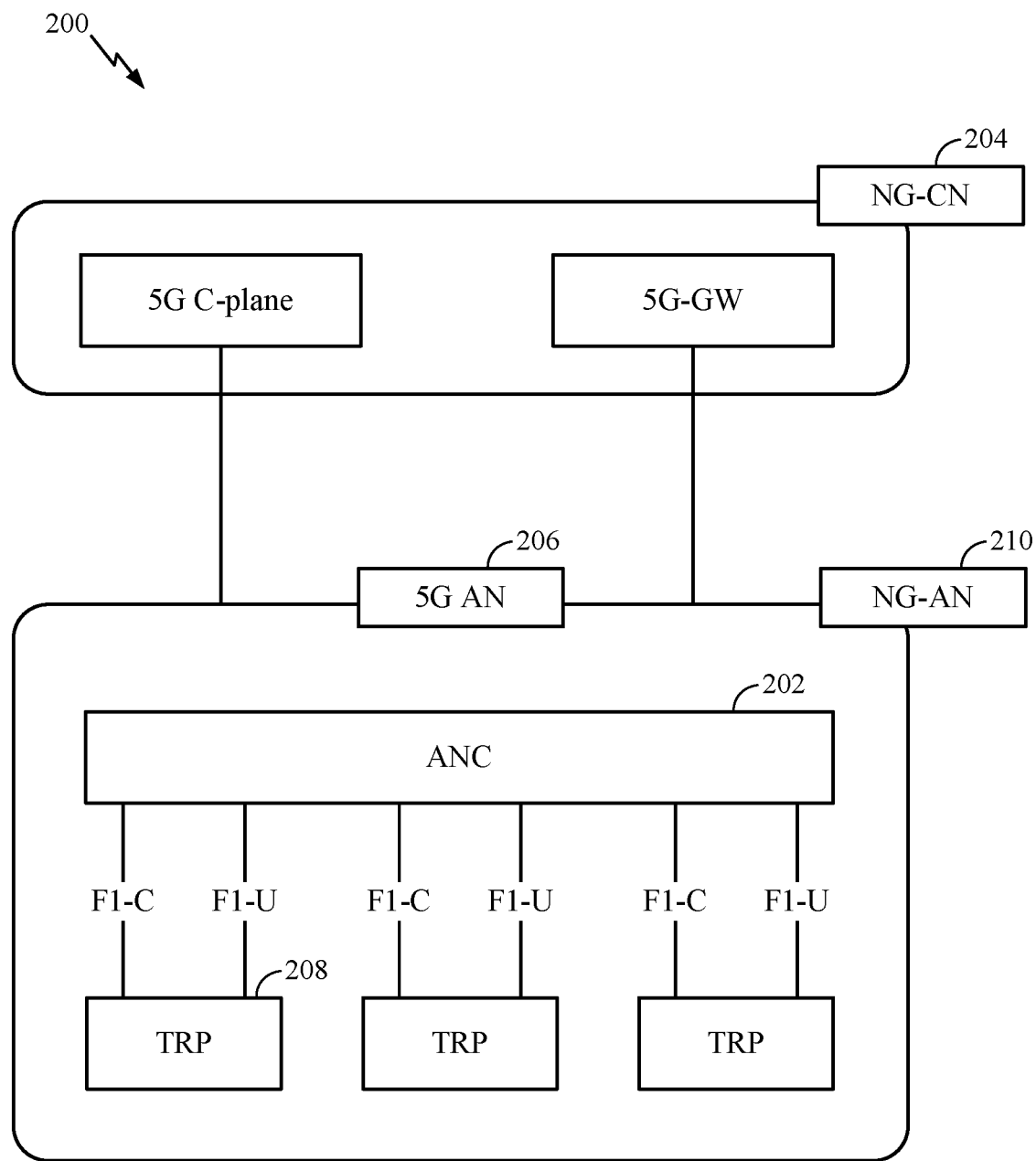
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support various backhauling and fronthauling solutions. This support may occur via and across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
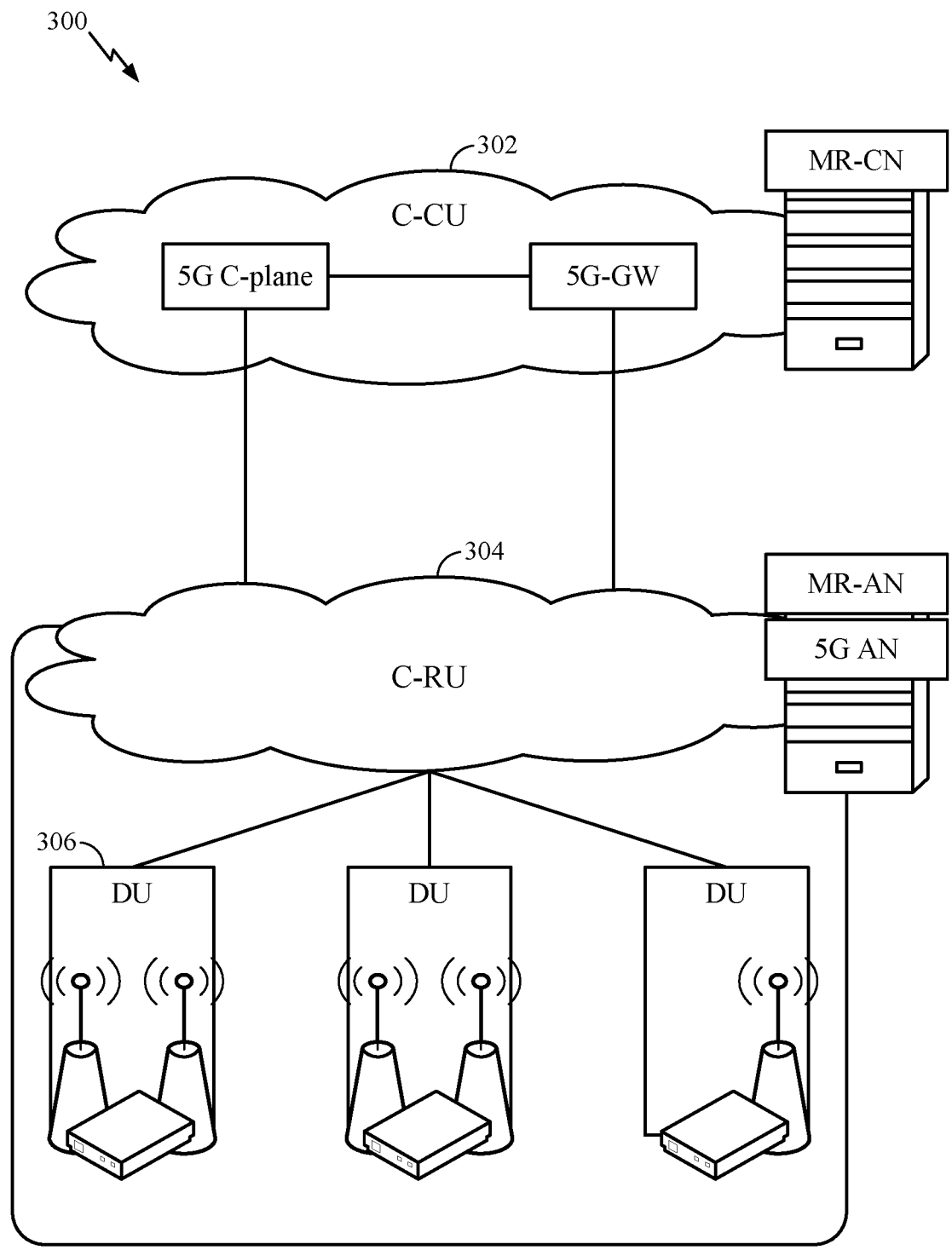
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
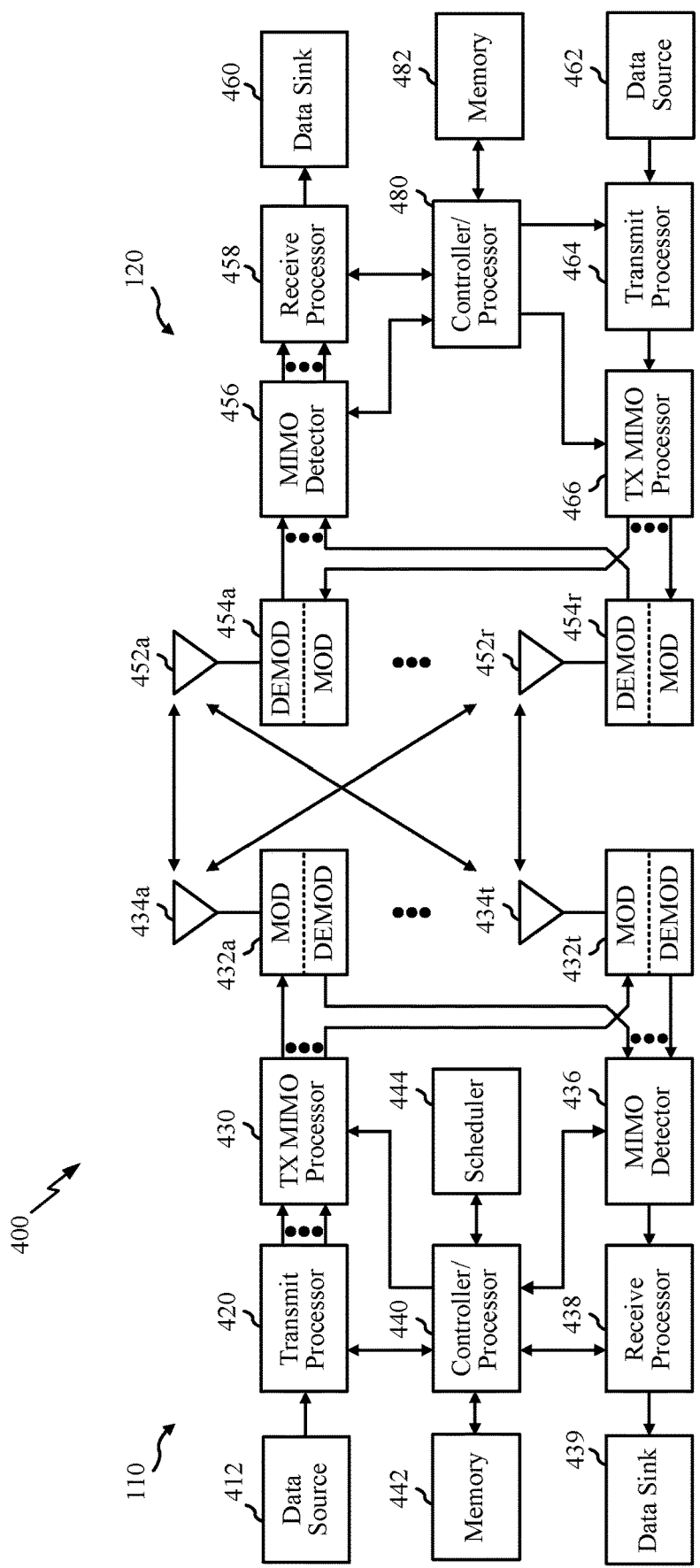
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be used to perform operations 1000 of FIG. 10, while antennas 434, processors 420, 460, 438, and/or controller/processor 440 of the BS 110 may be used to perform operations 1100 of FIG. 11.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, antennas 452a through 452r may receive downlink signals from the base station 110 and may provide received signals to demodulators (DEMODs) in transceivers 454a through 454r, respectively. Each demodulator 454 may condition (e.g., filter, amplify, down convert, and digitize) a respective received signal to obtain input samples. Each demodulator may further process input samples (e.g., for OFDM, etc.) to obtain received symbols. A MIMO detector 456 may obtain received symbols from all demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct operations at the base station 110 and the UE 120, respectively. The processor 440 and/or other processors and modules at the BS 110 may perform or direct execution of processes for techniques described herein. The memories 442 and 482 may store data and program codes for BS 110 and UE 120, respectively. A scheduler 444 may schedule UEs for data transmission on the downlink and/or uplink.

Figure 5:
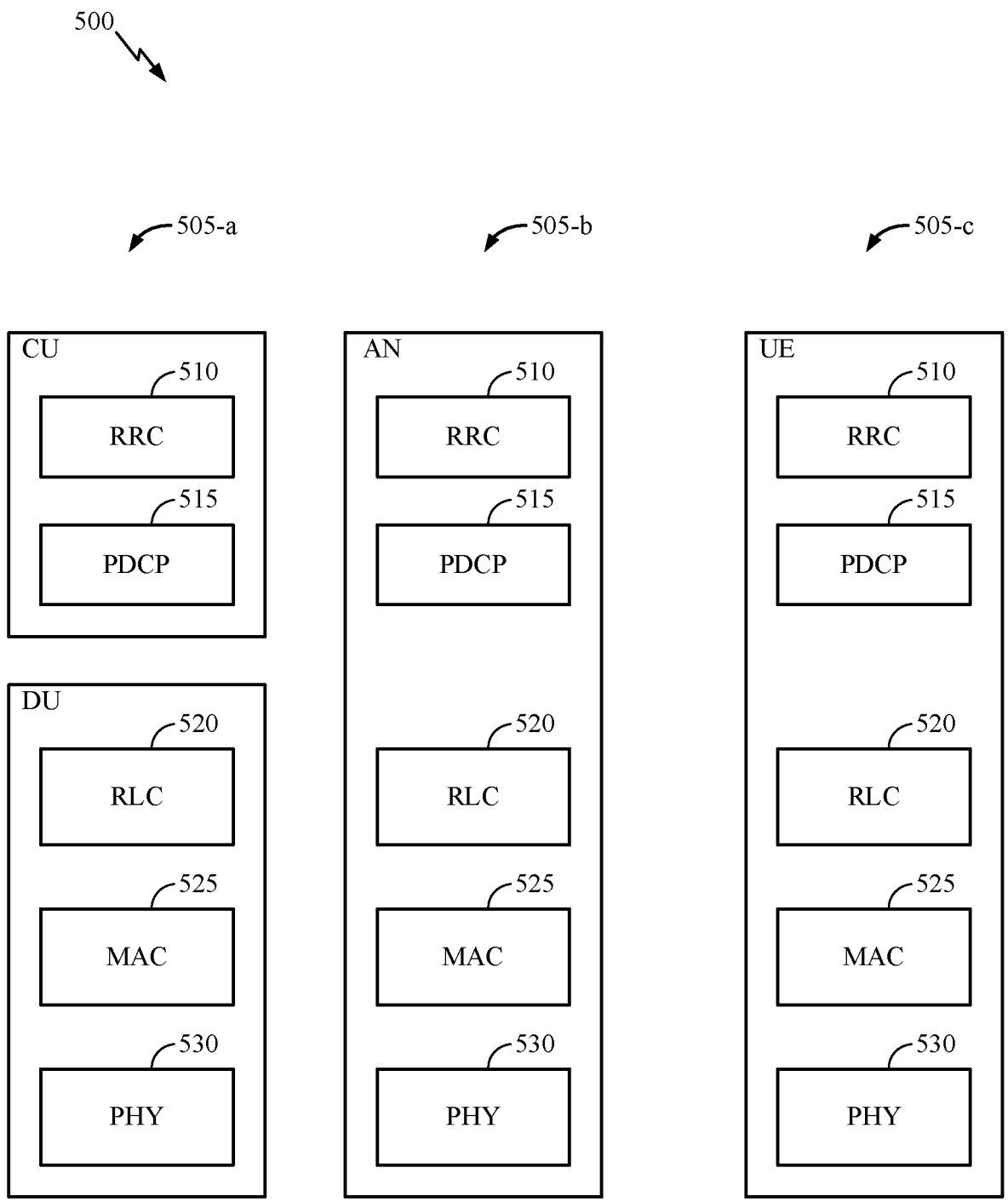
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility).

Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
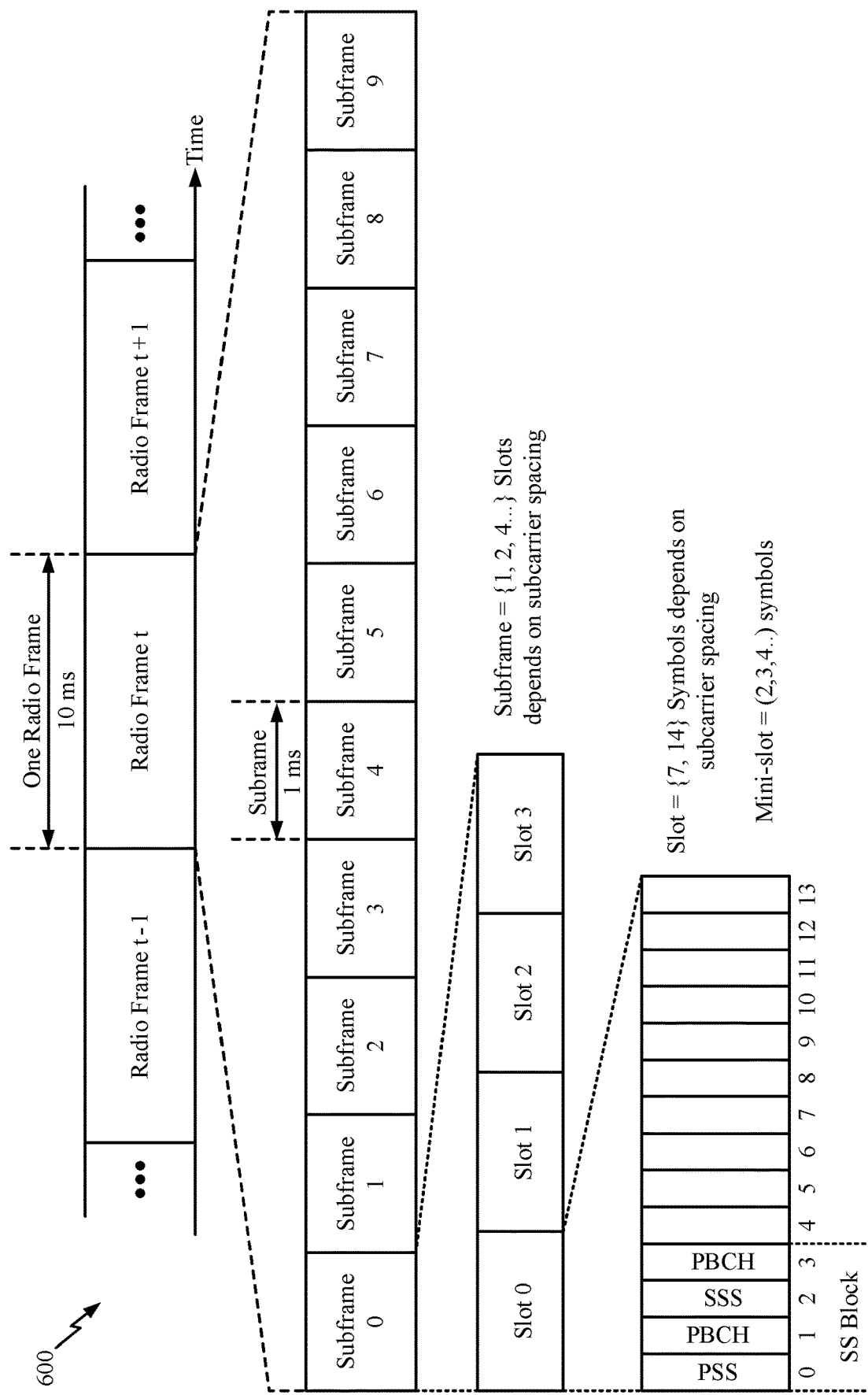
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Figure 7:
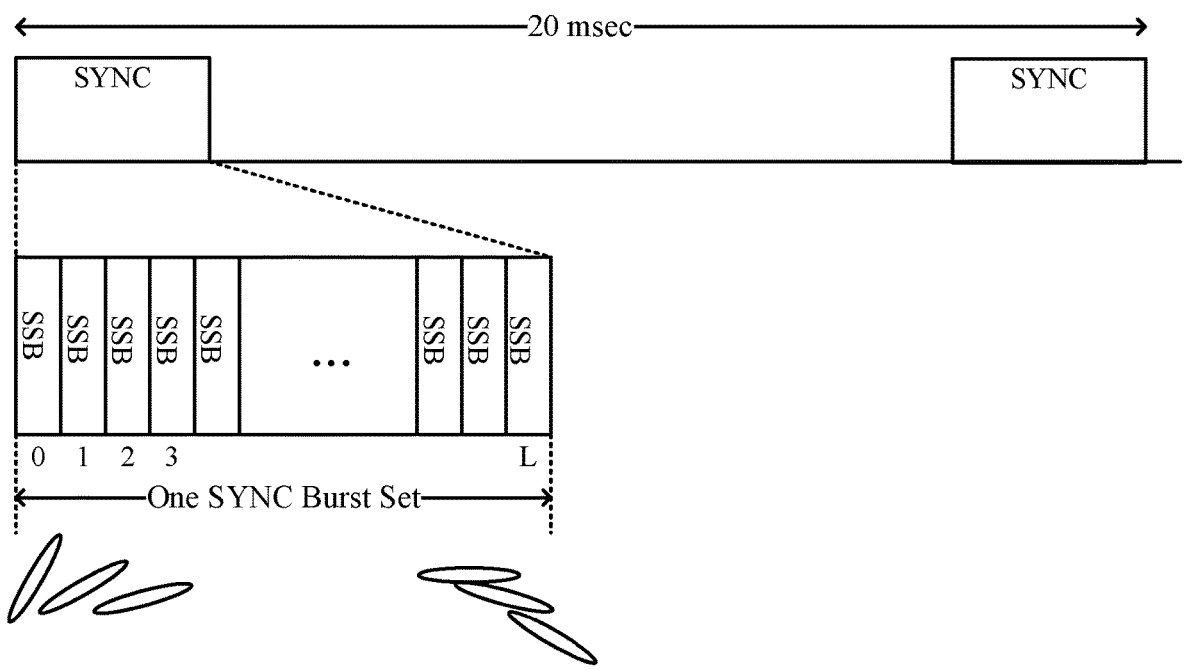
FIG. 7 illustrates how different synchronization signal blocks (SSBs) may be sent using different beams, in accordance with certain aspects of the present disclosure.

As shown in FIG. 7, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Control Resource Sets (CORESETs)

A control resource set (CORESET) for an OFDMA system (e.g., a communications system transmitting PDCCH using OFDMA waveforms) may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. Search spaces are generally areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitors the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and SCS. In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 8:
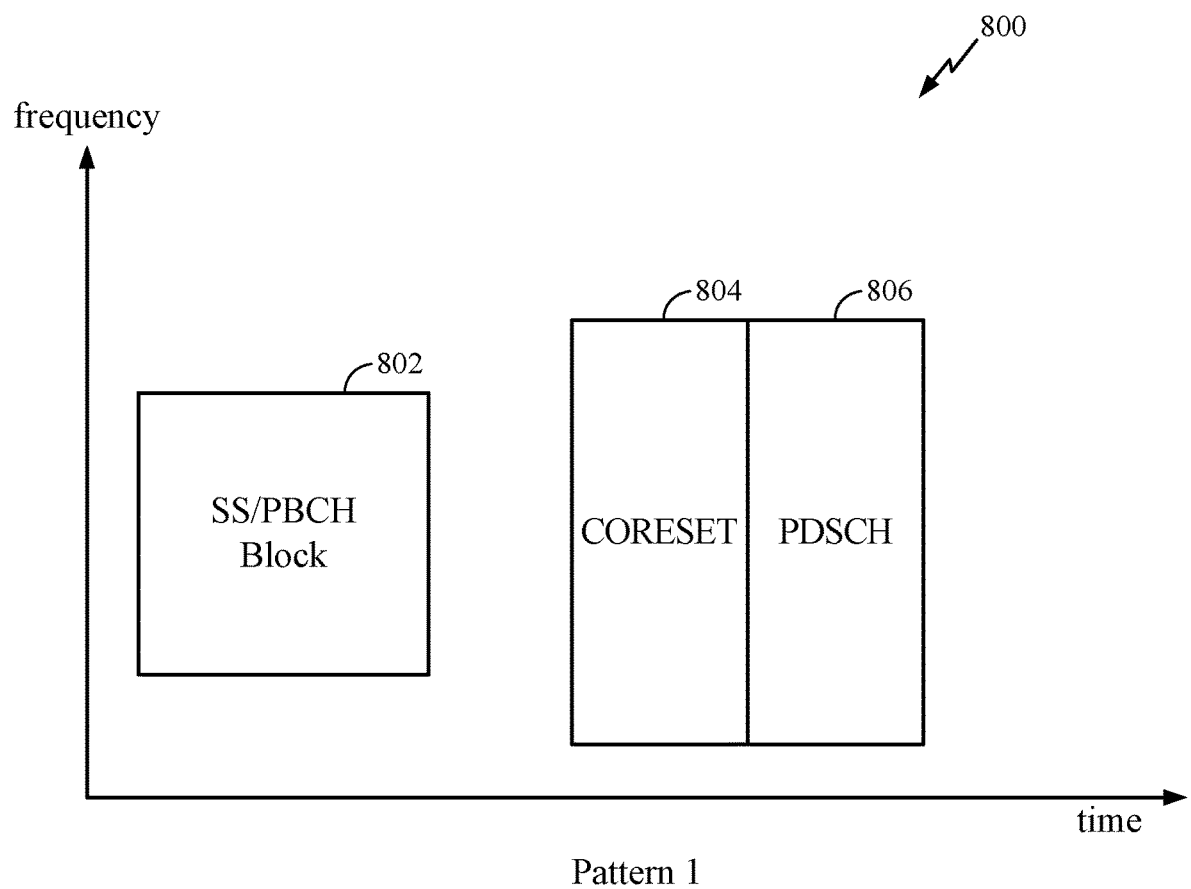
FIG. 8 shows an exemplary transmission resource mapping, according to aspects of the present disclosure.

FIG. 8 shows an exemplary transmission resource mapping 800, according to aspects of the present disclosure. In the exemplary mapping, a BS (e.g., BS 110a, shown in FIG. 1) transmits an SS/PBCH block 802. The SS/PBCH block includes a MIB conveying an index to a table that relates the time and frequency resources of the CORESET 804 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 806. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

QCL Port and TCI States

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (gNB) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI-RS set and the PDSCH DMRS ports.

In some cases, a UE may be configured with up to M TCI-States. Configuration of the M TCI-States can come about via higher layer signalling, while a UE may be signalled to decode PDSCH according to a detected PDCCH with DCI indicating one of the TCI states. Each configured TCI state may include one RS set TCI-RS-SetConfig that indicates different QCL assumptions between certain source and target signals.

Figure 9:
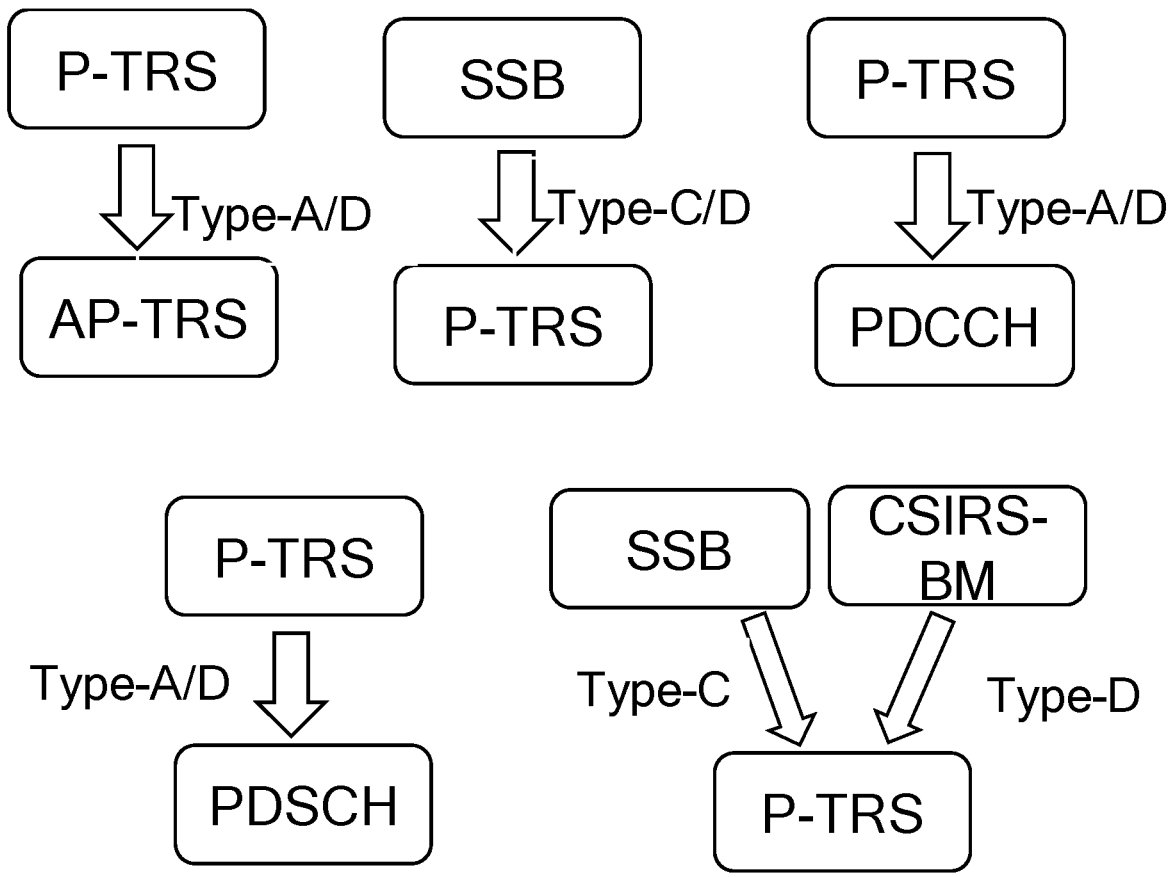
FIG. 9 illustrates example quasi co-location (QCL) relationships, in accordance with certain aspects of the present disclosure.

FIG. 9 illustrate examples of the association of DL reference signals with corresponding QCL types that may be indicated by a TCI-RS-SetConfig.

In the examples of FIG. 9, a source reference signal (RS) is indicated in the top block and is associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: PUSCH DMRS, CSIRS, TRS, and SRS.

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

As illustrated in FIG. 9, for the case of two DL RSs, the QCL types can take on a variety of arrangements. For example, QCL types may not be the same, regardless of whether the references are to the same DL RS or different DL RSs. In the illustrated example, SSB is associated with Type C QCL for phase tracking reference signal (P-TRS), while CSI-RS for beam management (CSIRS-BM) is associated with Type D QCL.

QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

An initial CORESET (e.g., CORESET ID 0 or simply CORESET#0) in NR may be identified during initial access by a UE (e.g., via a field in the MIB). A ControlResourceSet information element (CORESET IE) sent via radio resource control (RRC) signaling may convey information regarding a CORESET configured for a UE. The CORESET IE generally includes a CORESET ID, an indication of frequency domain resources (e.g., number of RBs) assigned to the CORESET, contiguous time duration of the CORESET in a number of symbols, and Transmission Configuration Indicator (TCI) states.

As noted above, a subset of the TCI states provide quasi co-location (QCL) relationships between DL RS(s) in one RS set (e.g., TCI-Set) and PDCCH demodulation RS (DMRS) ports. A particular TCI state for a given UE (e.g., for unicast PDCCH) may be conveyed to the UE by the Medium Access Control (MAC) Control Element (MAC-CE). The particular TCI state is generally selected from the set of TCI states conveyed by the CORESET IE, with the initial CORESET (CORESET#0) generally configured via MIB.

Search space information may also be provided via RRC signaling. For example, the SearchSpace IE is another RRC IE that defines how and where to search for PDCCH candidates for a given CORESET. Each search space is associated with one CORESET. The SearchSpace IE identifies a search space configured for a CORESET by a search space ID. In an aspect, the search space ID associated with CORESET #0 is SearchSpace ID #0. The search space is generally configured via PBCH (MIB).

Example Default Uplink Beam Determination

Aspects of the present disclosure provide apparatus, methods, processing systems, and computer readable mediums for determining a default uplink beam, for example, to use for at least one configured uplink resource before receiving an uplink beam configuration.

The techniques presented herein may be applied in multi-input multi-output new radio (NR) communications. For example, the UE may use the default uplink beam to configure uplink resource including a physical uplink shared channel (PUSCH), a sounding reference signal (SRS), a physical uplink control channel (PUCCH), or any combination thereof. The SRS may include the SRS used for beam management, codebook-based MIMO transmission, non-codebook-based MIMO transmission, and antenna switching.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec.

The techniques presented herein may be used to determine a default uplink beam in various scenarios. For example, if PUSCH may be scheduled on a CC in FR2 and in RRC-connected mode with PUCCH resource(s) configured. However, the configured PUCCH resource(s) may not be configured with beam information by spatial relation information or uplink TCI state. When CORESET(s) are configured on the CC in some cases, the TCI state or QCL assumption of the CORESET may be configured with the lowest ID. For example, the default spatial relation for dedicated-PUCCH or SRS for a CC in FR2 may be determined by the TCI state or QCL assumption of the CORESET with the lowest ID, at least when no path loss RSs are configured by RRC. UE behaviors regarding the default spatial relation and path loss RS may be enabled using RRC parameters:

enableDefaultBeamPlForPUSCH0_0, for PUSCH scheduled by DCI format 0_0
enableDefaultBeamPlForPUCCH, for dedicated PUCCH
enableDefaultBeamPlForSRS, for dedicated SRS.

In some cases, the techniques presented herein may allow a more optimal beam to be used as a default beam than an uplink beam selected according to current rules (e.g., according to Rel. 15 or 16). For example, in Rel. 15, the beam for PUSCH scheduled by DCI0_0 may follow the PUCCH beam; and the beam for PUSCH scheduled by DCI0_1 may follow the SRS beam. In Rel. 16, when no beam is for PUCCH/SRS, the beam for PUSCH scheduled by DCI 0_0 or 0_1 may follow the beam for a CORESET or PDSCH reception. In some examples related to the disclosure herein, the beam for PUSCH scheduled by DCI 0_1 may use the beam associated with: UL TCI, SRS, CORESET, PDSCH beam, or Msg 3 PUSCH beam; the beam for PUSCH scheduled by DCI0_0 may use the beam associated with: PUCCH, CORESET, PDSCH beam, or Msg 3 PUSCH beam.

Figure 10:
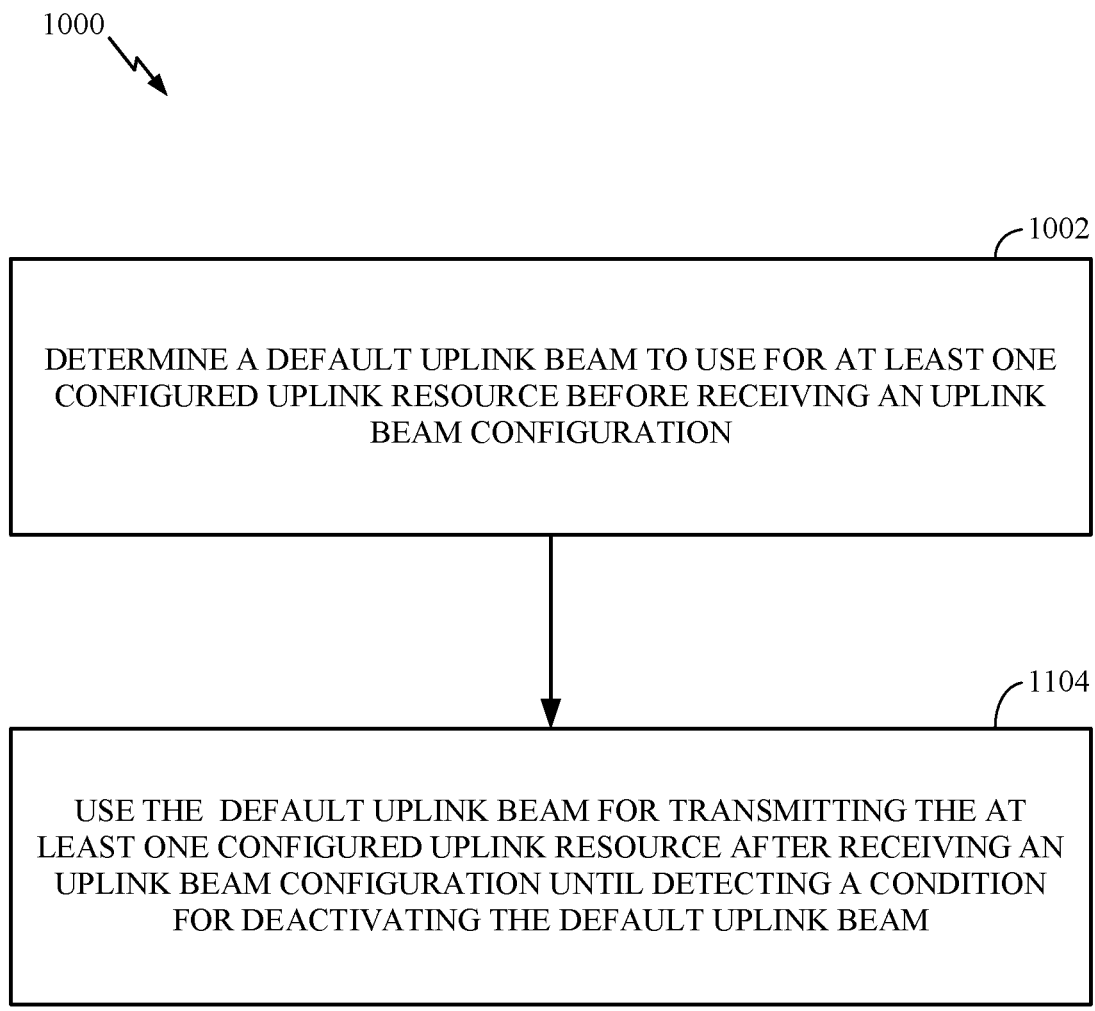
FIG. 10 illustrates example operations for wireless communications by a user equipment (UE), in accordance with certain aspects of the present disclosure.

FIG. 10 illustrates example operations 1000 for wireless communications by a user equipment (UE), in accordance with certain aspects of the present disclosure. Operations 1000 may be performed, for example, by a UE 120 of FIG. 1 or FIG. 4, to determine an uplink beam to use.

Operations 1000 begin, at 1002, by determining a default uplink beam to use for at least one configured uplink resource before receiving an uplink beam configuration, or when there is no available uplink beam configuration. At 1004, the UE uses the default uplink beam for transmitting the at least one configured uplink resource after receiving an uplink beam configuration.

Figure 11:
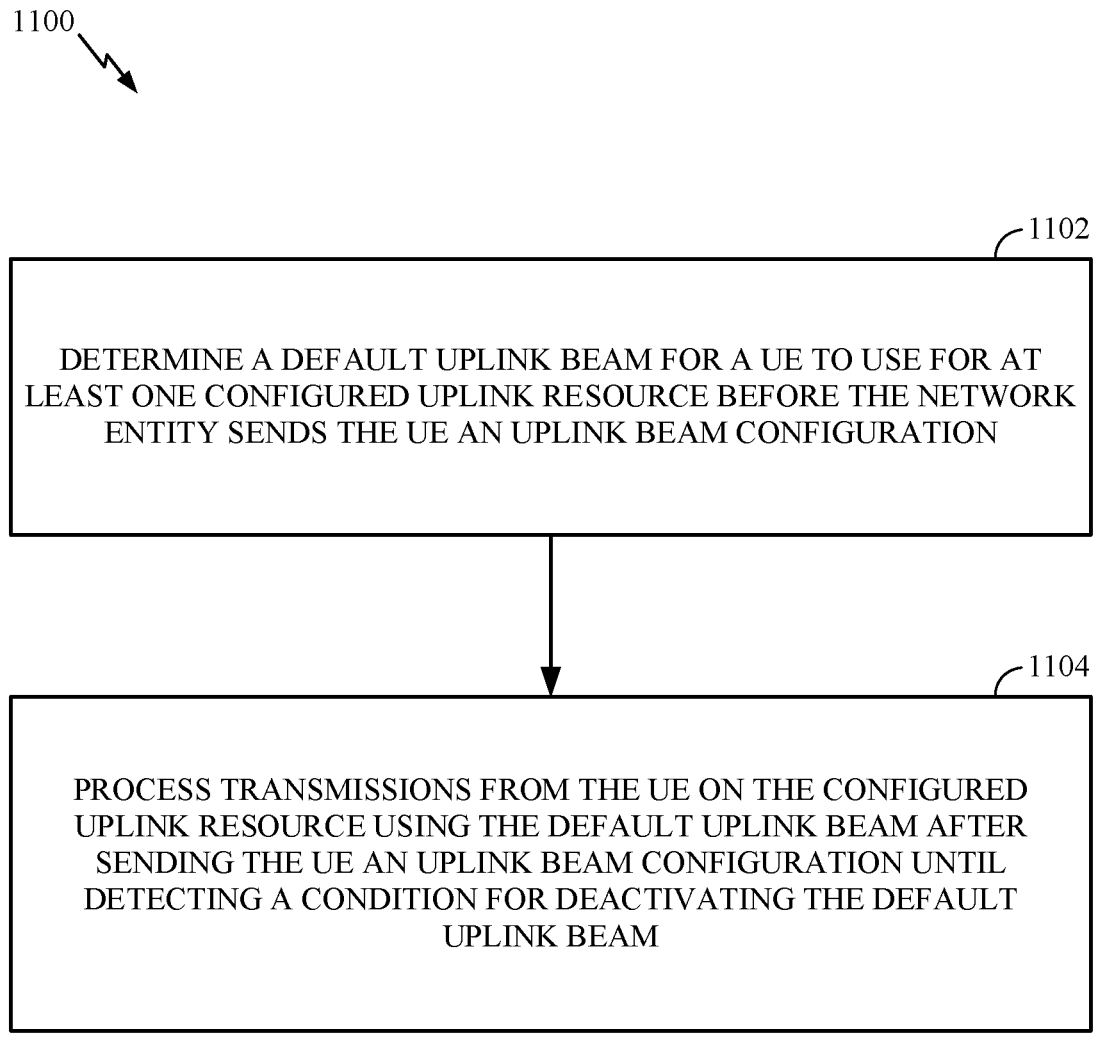
FIG. 11 illustrates example operations for wireless communications by a network entity, in accordance with certain aspects of the present disclosure.

FIG. 11 illustrates example operations 1100 for wireless communications by a network entity that may be considered complementary to operations 1000 of FIG. 10. For example, operations 1100 may be performed by a base station 110 of FIG. 1 or FIG. 4.

Operations 1100 begin, at 1102, by determining a default uplink beam for a UE to use for at least one configured uplink resource before the network entity sends the UE an uplink beam configuration, or when there is no available uplink beam configuration. At 1104, the network entity processes transmissions from the UE sent on the configured uplink resource using the default uplink beam after sending the UE an uplink beam configuration until detecting a condition for deactivating the default uplink beam.

The techniques described herein may be used to determine a default uplink beam, for example, before the UE has received any beam configuration, such as an RRC configuration for a UL TCI list, or when there is no available uplink beam configuration. The at least one configured uplink resource may include at least one of a PUSCH, an SRS, or a PUCCH. In some embodiments, the default uplink beam may correspond to a spatial domain transmission filter used for a message scheduled by a random access response (RAR), in an initial access or reconfiguration procedure.

In some cases, if the UE is provided with an RRC configuration enabling a default beam for a PUCCH or a type of PUSCH, a default uplink beam for a configured PUCCH or PUCCH/PUSCH following Msg3 PUSCH beam is deactivated until a subsequent deactivation command.

In some instances, the UE may use the default uplink beam until detecting a condition for deactivating the default uplink beam. For example, the condition for deactivating the default uplink beam may include receipt of a medium access control (MAC) control element (CE). The MAC CE may include a MAC CE that activates a transmission configuration indicator (TCI) state for an uplink resource other than a PUSCH, such as, for example, a PUCCH or SRS.

In some cases, the MAC CE may include a MAC CE that indicates a TCI state subset selection for a PUSCH, where the selected subset is used in DCI indication for TCI. For example, the MAC CE may deactivate a default uplink beam for PUSCH only. In other cases, the MAC CE may deactivate a default beam for both PDSCH and a PUSCH. For example, the MAC CE deactivating the default uplink beam can be the one for a TCI state subset selection for a PDSCH, where the selected subset is used in DCI indication for TCI.

In some instances, the MAC CE deactivating the default uplink beam may include a MAC CE that activates a TCI state. For example, the MAC CE may jointly deactivate a default beam for multiple types of downlink and uplink resources. For example, the MAC CE can be used for activating a TCI for a CORESET.

In some cases, the UE may receive the uplink beam configuration via an RRC configuration for an uplink TCI list.

In some instances, if the UE is provided with an RRC configuration enabling a second default beam for an uplink resource, a first default uplink beam for a configured uplink resource is deactivated until a subsequent deactivation command. The first default uplink beam for the configured uplink resource may follow the uplink beam for a message scheduled by an RAR.

In some cases, an uplink beam configuration may be sent to the UE via an RRC configuration for an uplink TCI state list. In some cases, the configured uplink resource may include at least one of a PUSCH, an SRS, or a PUCCH.

In some instances, the default uplink beam corresponds to a spatial domain transmission filter used for a message scheduled by an RAR in an initial access or reconfiguration procedure.

In some cases, if the UE is provided with an RRC configuration enabling a second default beam for an uplink resource, the first default uplink beam for a configured uplink resource may be deactivated until a subsequent deactivation command. The first default uplink beam for a configured uplink resource may follow the uplink beam for a message scheduled by an RAR.

For example, the condition for deactivating the default uplink beam may include receiving an acknowledgment of acknowledgment from the UE of a MAC CE sent by the network entity. The MAC CE may include a MAC CE that activates a TCI state for an uplink resource other than a PUSCH, such as a PUCCH or an SRS, for example.

In some instances, the MAC CE may include a MAC CE that indicates a TCI state subset selection for a PUSCH. The MAC CE may deactivate a default uplink beam for PUSCH only in some situations. In other situations, the MAC CE may deactivate a default beam for both a PDSCH and a PUSCH.

In some cases, the MAC CE may include a MAC CE that activates a downlink TCI state. For example, the MAC CE may jointly deactivates a default beam for multiple types of downlink and uplink resources.

In some other cases, the condition for deactivating the default uplink beam may include the UE being provided with a single TCI state for a CORESET and a field is set to a value that indicates a TCI field is not present in a DCI for a PDSCH.

As described above, the techniques proposed herein may help enable a default uplink beam to use for at least one configured uplink resource. For example, when the UE has not received a beam configuration, such as before receiving the RRC configuration for a UL TCI list. In other instances, the enabled default uplink beam may be used after receiving a beam configuration, but before receiving a deactivation command, such as shown in the period of uncertainty in FIG. 13. The uplink resource may include PUSCH (e.g., scheduled by DCI0_0, DCI0_1, and DCI0_2), SRS (e.g., SRS for CB and NCB), PUCCH, or the link.

According to a second aspect, the default UL beam to use for one configured uplink source may be from Msg3 PUSCH in the initial access or during the Reconfiguration with the synchronization procedure. For example, when the UE has not been provided a configuration of TCI state(s) for the PUSCH, or has been provided initial configuration of more than one TCI states for the PUSCH but has not received a MAC CE activation command for one of the TCI states, the UE may transmit the PUSCH (e.g., to a primary cell) using the same spatial domain transmission filter as for a PUSCH transmission scheduled by an RAR UL grant in the same cell during the initial access procedure. In other instances, when the UE has been provided configuration of more than one TCI states for the PUSCH as part of Reconfiguration with the synchronization procedure, but has not received a MAC CE activation command for one of the TCI states, the UE may transmit the PUSCH (e.g., to the primary cell) using the same spatial domain transmission filter as for a PUSCH transmission scheduled by an RAR UL grant in the same cell during reconfiguration with the synchronization procedure.

According to a third aspect, the default UL beam for a configured UL resource may be deactivated after 3 ms of ACK to PDSCH carrying a deactivation command. For example, in one option, a MAC CE TCI activation for a UL TCI state for UL resource other than PUSCH, such as, for example, PUCCH and SRS, among others. For example, the PUSCH beam may follow the PUCCH or SRS beam. In a second option, the MAC CE TCI subset may be selected for PUSCH. For example, the TCI subset selection MAC CE may be common or different for PDSCH and PUSCH. The UL PUSCH only, or PDSCH/PUSCH commonly may deactivate the default beam. In a third option, the MAC CE TCI may be used to activate a DL TCI state. For example, the MAC CE may be used for a CORESET TCI activation, or for a PDSCH TCI subset selection. The PDCCH, PDSCH, and PUSCH, among other types of DL and UL resources, may jointly deactivate the default uplink beam.

According to a fourth aspect, the default uplink beam may be deactivated if the UE is provided with a single TCI state for a CORESET and tci-PresentInDCI that is set as not "enabled" for PDSCH. Such a configuration may be applicable to a corner case of no MAC CE for any TCI, such that PDSCH/PUSCH/PUCCH/SRS may follow an RRC configured single CORESET TCI.

According to a fifth aspect, the default UL beam for a configured PUCCH/PUSCH following the Msg3 PUSCH beam may be deactivated until receiving a deactivation command when the UE is provided with an RRC configuration that enables "enableDefaultBeamPIForPUCCH" or "enableDefaultBeamPIForPUSCH0_0."

In some cases, the network may indicate (e.g., in RRC configuration or at the scheduling of the dynamic CORESET) that the dynamic CORESET shares the same configured and activated TCI states with its scheduling CORESET.

Figure 12A:
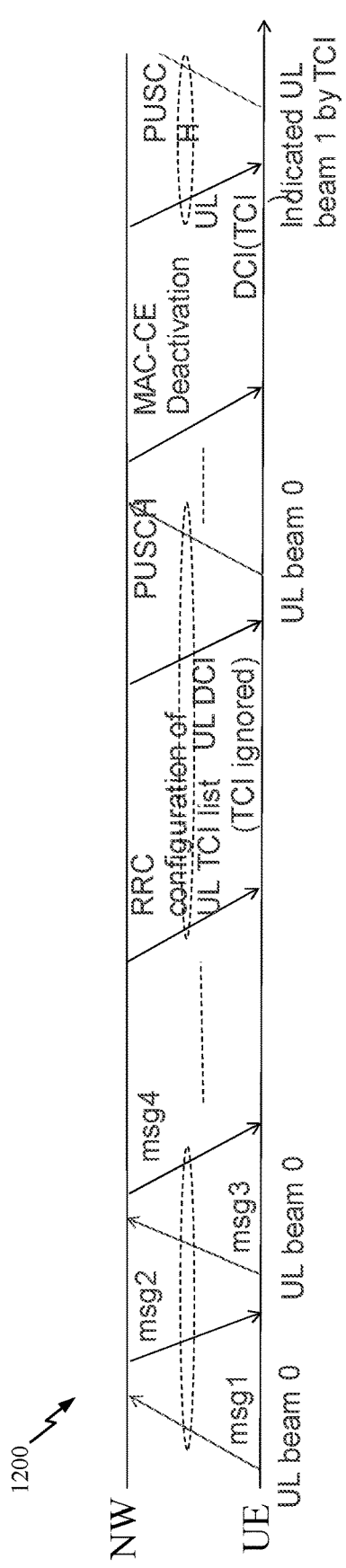
FIGS. 12A-12C illustrate example default uplink beam scenarios, in accordance with certain aspects of the present disclosure.

FIG. 12A illustrates example timing diagram 1200 for using a default uplink beam with separate deactivation of default uplink and downlink beams, in accordance with aspects of the present disclosure.

As shown in FIG. 12A, the UE initially uses a first default uplink beam (UL beam 0), before receiving an RRC configuration of an UL TCI list. As illustrated, after receiving the RRC configuration, the UE initially ignores the TCI and continues to use default beam 0 for a PUSCH transmission until the default uplink beam (UL beam 0) is deactivated via a MAC-CE deactivation. After the deactivation, the UE may use a beam (UL beam 1) indicated by the TCI.

Figure 12B:
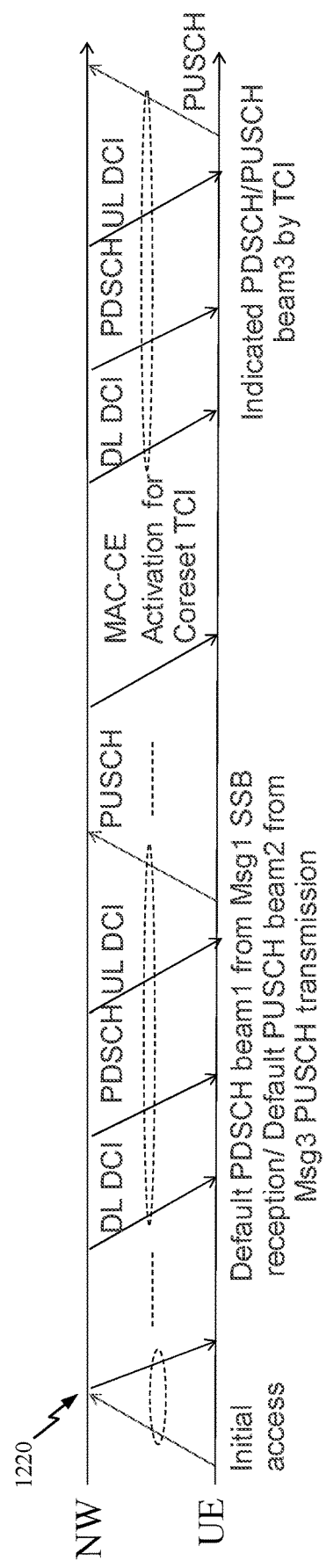

FIG. 12B illustrates example timing diagram 1200 for using a default uplink beam with joint deactivation of default uplink and downlink beams, in accordance with aspects of the present disclosure.

As shown in FIG. 12B, the UE may determine an initial uplink beam based on a default PDSCH beam 1 from Msg1 SSB reception or a default PUSCH beam2 from a Msg3 PUSCH transmission (e.g., scheduled by a RAR) for an initial access procedure. As illustrated, the UE may use default PUSCH beam 2 (and default PDSCH beam 1) until it receives a MAC CE activation for a CORESET TCI, which serves to deactivate the default uplink beam 2 and default downlink beam 1. As illustrated, the UE subsequently uses the PDSCH beam and PUSCH beam (beam 3) indicated by TCI.

Figure 12C:
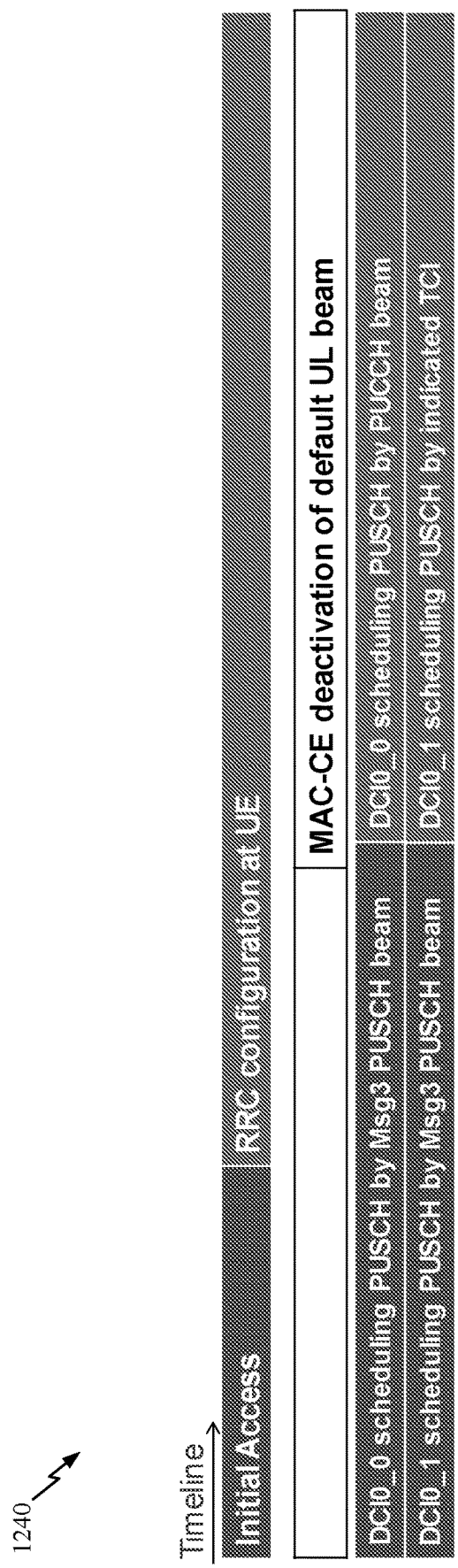

FIG. 12C is a timing diagram 1240 that summarizes the timing of using an uplink default beam, in accordance with the present disclosure, before and after initial access, RRC configuration, and deactivation of the default uplink beam. As shown, the UE may first use a default uplink beam based on DCI scheduling a PUSCH for message 3 (e.g., scheduled by a RAR). As illustrated, even after RRC configuration, the UE may continue to use the default uplink beam until deactivation (e.g., via a MAC CE), after which time the UE may begin using an uplink beam for PUSCH indicated via PUCCH (e.g., an UL DCI).

In some cases, the beam for PUSCH scheduled by DCI0_0 may follow the beam for PUCCH. Alternatively if the beam for PUCCH is not available, PUSCH scheduled by DCI0_0 may follow the beam for a CORESET. Furthermore, if the beam for neither PUCCH nor CORESET is available, the beam for PUSCH scheduled by DCI0_0 may follow the beam for PDSCH. In some cases, the beam for PUSCH scheduled by DCI0_1 may follow the beam for SRS. If the beam for SRS is not available, the PUSCH scheduled by DCI0_1 may follow the beam for a CORESET. If the beam for neither SRS nor CORESET is available, the beam for PUSCH scheduled by DCI0_1 may follow the beam for PDSCH.

Figure 13:
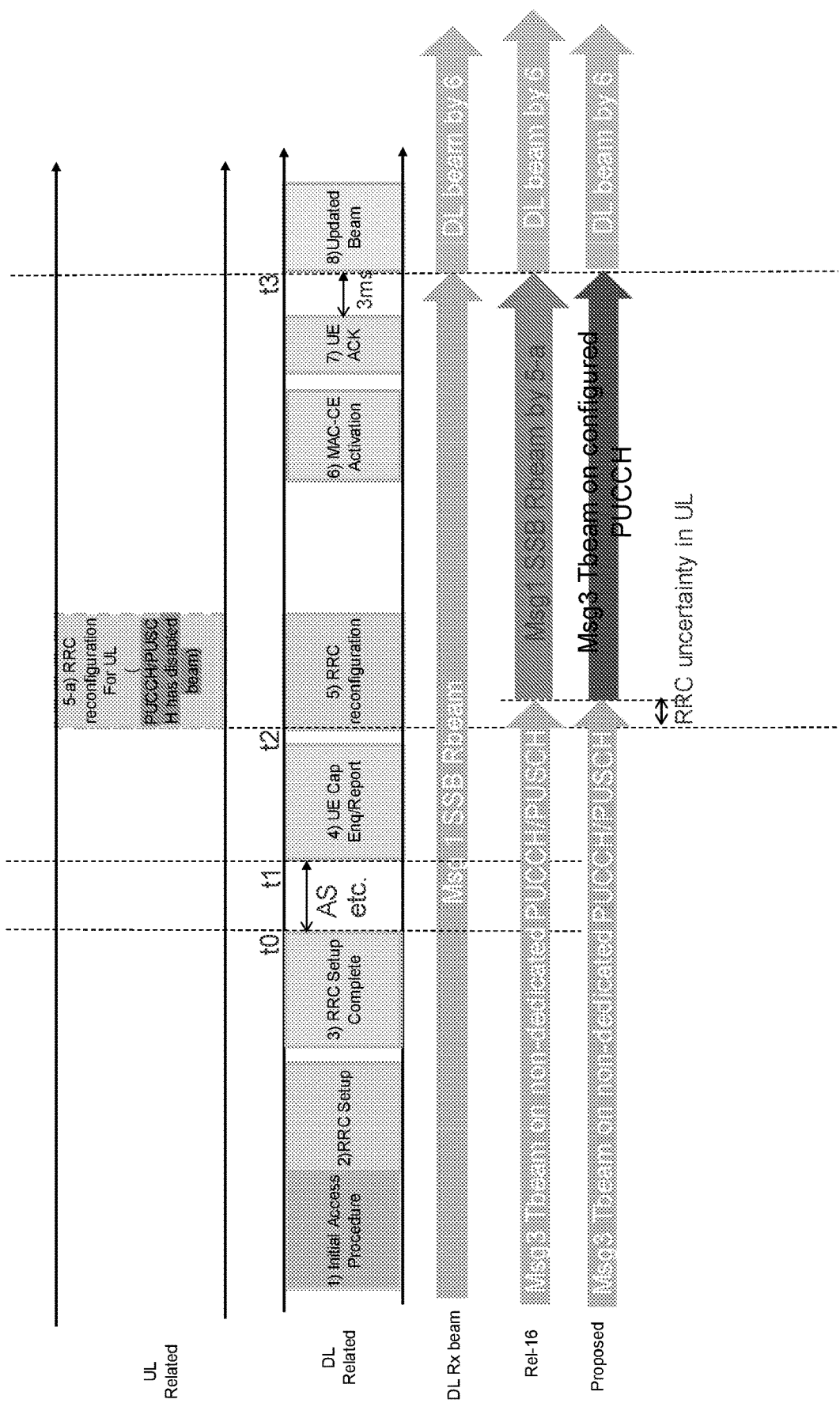
FIG. 13 illustrates a comparison of techniques for determining a default uplink beam.

FIG. 13 illustrates an example comparative diagram showing the disclosed method for providing the default uplink beam, in accordance with some aspects of the present disclosure. FIG. 13 illustrates pertinent uplink related communication in the first row, and the downlink related communication in the second. The third row shows the downlink transmission beam.

The fourth and the fifth rows compare the technique proposed herein with an existing default UL beam scheme (of Release 16). As shown, in both cases, a Msg3 Tbeam (e.g., determined in an initial access procedure) is used as a default uplink beam on non-dedicated PUCCH/PUSCH. As illustrated, however, after RRC reconfiguration (at step 5-a), the Release 16 scheme switches to a default uplink beam based on a Msg 1 SSB receive beam. In contrast, according to the technique proposed herein, the UE may continue to use the default uplink beam (which is a more optimal uplink beam than the default uplink beam based on SSB), until deactivation (e.g., after a MAC-CE activation at step 6).

Figure 14:
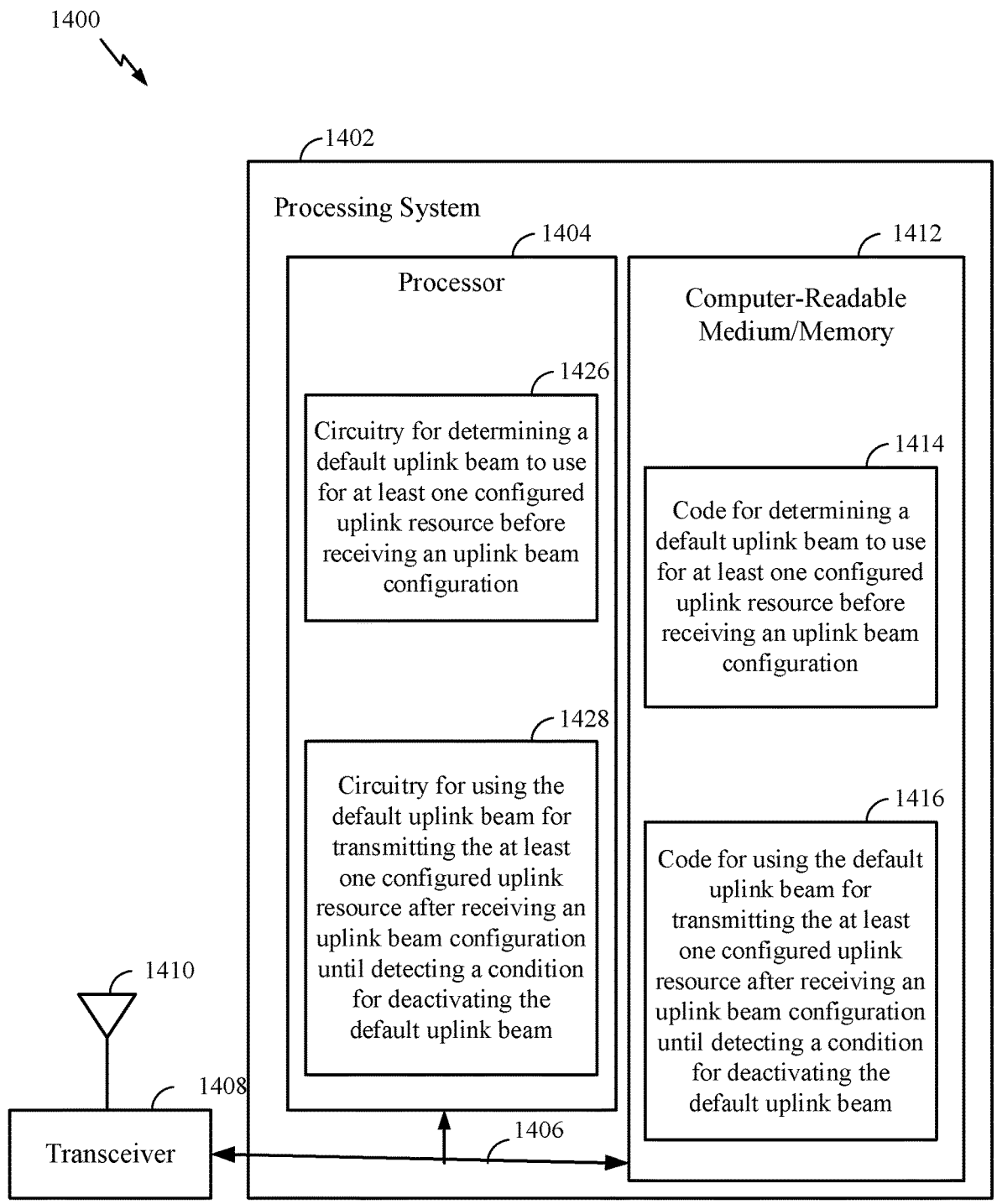
FIGS. 14-15 illustrate example communications devices that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations 1000 illustrated in FIG. 10. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations 1000 illustrated in FIG. 10, or other operations for performing the various techniques discussed herein. In certain aspects, computer-readable medium/memory 1412 stores code 1414 for determining a default uplink beam to use for at least one configured uplink resource before receiving an uplink beam configuration; and code 1416 for using the default uplink beam for transmitting the at least one configured uplink resource after receiving an uplink beam configuration until detecting a condition for deactivating the default uplink beam. In certain aspects, the processor 1404 has circuitry configured to implement the code stored in the computer-readable medium/memory 1412. The processor 1404 includes the circuitry 1426 for determining a default uplink beam to use for at least one configured uplink resource before receiving an uplink beam configuration; the circuitry 1428 for using the default uplink beam for transmitting the at least one configured uplink resource after receiving an uplink beam configuration until detecting a condition for deactivating the default uplink beam.

Figure 15:
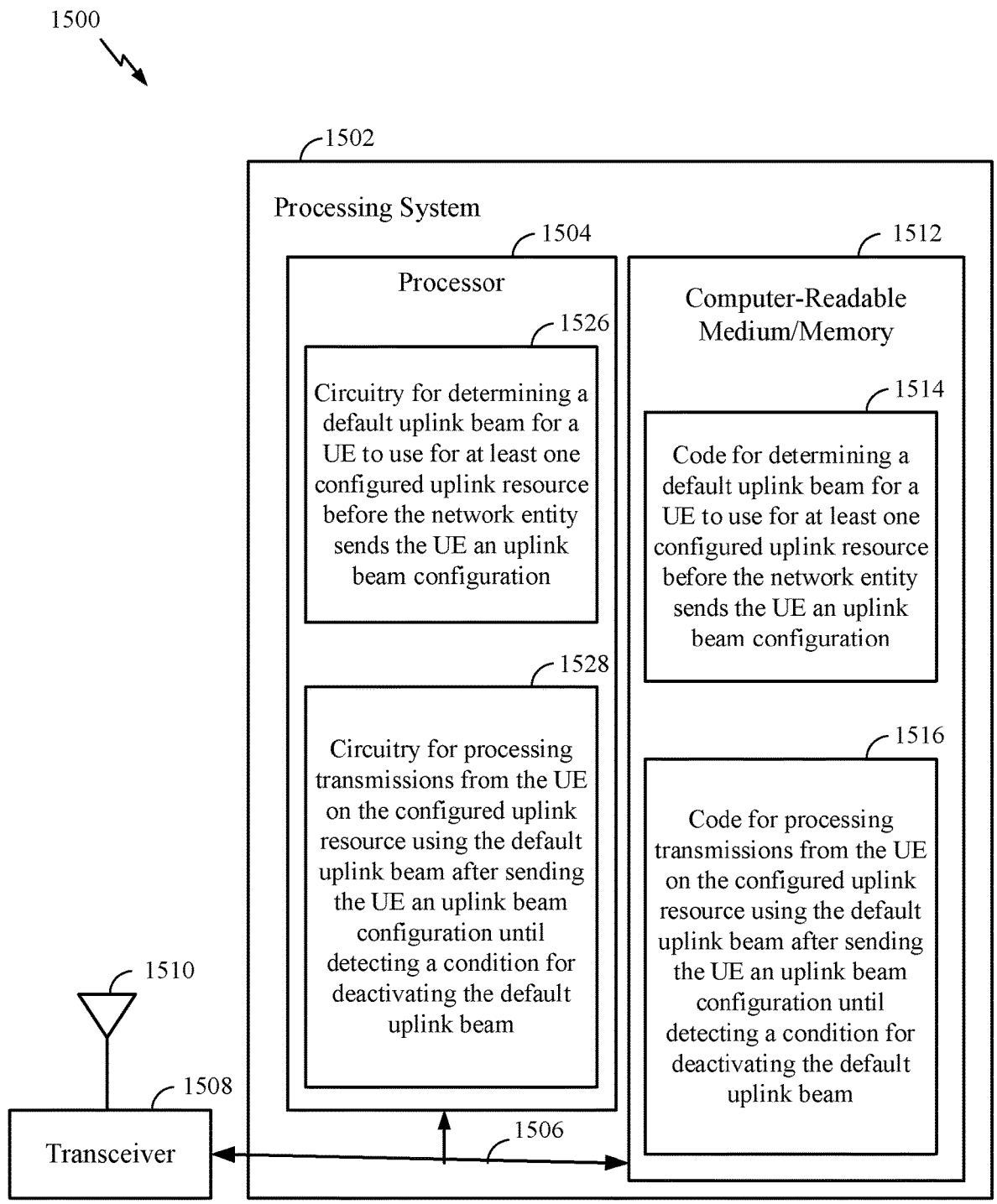

FIG. 15 illustrates a communications device 1500 that may include various components (e.g., corresponding to means-plus-function components) configured to perform operations for the techniques disclosed herein, such as the operations 1100 illustrated in FIG. 11. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 11, or other operations for performing the various techniques discussed herein. In certain aspects, computer-readable medium/memory 1512 stores: code 1514 for determining a default uplink beam for a UE to use for at least one configured uplink resource before the network entity sends the UE an uplink beam configuration; and code 1516 for processing transmission from the UE on the configured uplink resource using the default uplink beam after sending the UE an uplink beam configuration until detecting a condition for deactivating the default uplink beam. In certain aspects, the processor 1504 has circuitry configured to implement the code stored in the computer-readable medium/memory 1512. The processor 1504 includes circuitry 1526 for determining a default uplink beam for a UE to use for at least one configured uplink resource before the network entity sends the UE an uplink beam configuration, and circuitry 1528 for processing transmission from the UE on the configured uplink resource using the default uplink beam after sending the UE an uplink beam configuration until detecting a condition for deactivating the default uplink beam.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, processors 458, 464, 466, and/or controller/processor 480 of the UE 120 and/or processors 420, 430, 438, and/or controller/processor 440 of the BS 110 shown in FIG. 4 may be configured to perform operations 1000 of FIG. 10 or operations 1100 of FIG. 11.

Means for receiving may include a receiver (such as one or more antennas or receive processors) illustrated in FIG. 4. Means for transmitting may include a transmitter (such as one or more antennas or transmit processors) illustrated in FIG. 4. Means for determining, means for processing, means for treating, and means for applying may include a processing system, which may include one or more processors, such as processors 458, 464, 466, and/or controller/processor 480 of the UE 120 and/or processors 420, 430, 438, and/or controller/processor 440 of the BS 110 shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RANI, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), the method comprising:
   determining a default uplink beam to use for a physical uplink shared channel (PUSCH) before receiving a radio resource control (RRC) configuration for an uplink transmission configuration indicator (TCI) state list;
   using the default uplink beam for transmitting the PUSCH; and
   deactivating the default uplink beam for the PUSCH in response to receipt of signaling that configures a single TCI state for a control resource set (CORESET) and with a field set to a value that indicates a TCI field is not present in a downlink control information (DCI).

2. The method of claim 1, further comprising determining a default uplink beam to use for a sounding reference signal (SRS) or a physical uplink control channel (PUCCH).

3. The method of claim 1, wherein determining the default uplink beam to use for the PUSCH comprises determining the default uplink beam that corresponds to a spatial domain transmission filter used for a message scheduled by a random access response (RAR) in an initial access or reconfiguration procedure.

4. The method of claim 1, wherein the deactivating comprises deactivating:
   the default uplink beam for the PUSCH only; or
   a default beam for both a physical downlink shared channel (PDSCH) and the PUSCH.

5. The method of claim 1, wherein the deactivating comprises jointly deactivates the default uplink beam and one or more default beams for one or more types of downlink and uplink resources.

6. The method of claim 1, further comprising using a second default uplink beam for the PUSCH in response to deactivation of the default uplink beam for the PUSCH.

7. A method for wireless communications by a network entity, the method comprising:
   determining a default uplink beam for a user equipment (UE) to use for a physical uplink shared channel (PUSCH) before the network entity sends the UE a radio resource control (RRC) configuration for an uplink transmission configuration indicator (TCI) state list;
   processing transmissions from the UE sent on the PUSCH using the default uplink beam;
   sending signaling to the UE that configures a single TCI state for a control resource set (CORESET) and with a field set to a value that indicates a TCI field is not present in a downlink control information (DCI); and
   deactivating the default uplink beam for the PUSCH in response to receipt, from the UE, of an acknowledgment of the signaling.

8. The method of claim 7, further comprising determining a default uplink beam for the UE to use for a sounding reference signal (SRS) or a physical uplink control channel (PUCCH).

9. The method of claim 7, wherein determining the default uplink beam for the UE to use for the PUSCH comprises determining the default uplink beam that corresponds to a spatial domain transmission filter used for a message scheduled by a random access response (RAR) in an initial access or reconfiguration procedure.

10. The method of claim 7, wherein the deactivating comprises deactivating:
the default uplink beam for the PUSCH only; or
a default beam for both a physical downlink shared channel (PDSCH) and the PUSCH.

11. The method of claim 7, wherein the deactivating comprises jointly deactivates the default uplink beam and one or more default beams for multiple types of downlink and uplink resources.

12. The method of claim 9, further comprising using a second default uplink beam for the PUSCH in response to deactivation of the default uplink beam for the PUSCH.

13. An apparatus for wireless communications by a user equipment (UE), the apparatus comprising:
means for determining a default uplink beam to use for a physical uplink shared channel (PUSCH) before receiving a radio resource control (RRC) configuration for an uplink transmission configuration indicator (TCI) state list; and
means for using the default uplink beam for transmitting the PUSCH; and
means for deactivating the default uplink beam for the PUSCH in response to receipt of signaling that configures a single TCI state for a control resource set (CORESET) and with a field set to a value that indicates a TCI field is not present in a downlink control information (DCI).

14. An apparatus for wireless communications by a network entity, the apparatus comprising:
means for determining a default uplink beam for a user equipment (UE) to use for a physical uplink shared channel (PUSCH) before the network entity sends the UE a radio resource control (RRC) configuration for an uplink transmission configuration indicator (TCI) state list;
means for processing transmissions from the UE sent on the PUSCH using the default uplink beam;
means for sending signaling to the UE that configures a single TCI state for a control resource set (CORESET) and with a field set to a value that indicates a TCI field is not present in a downlink control information (DCI); and
means for deactivating the default uplink beam for the PUSCH in response to receipt, from the UE, of an acknowledgment of the signaling.

15. An apparatus for wireless communications by a user equipment (UE), the apparatus comprising:
at least one processor and a memory configured to cause the apparatus to:
determine a default uplink beam to use for a physical uplink shared channel (PUSCH) before receiving a radio resource control (RRC) configuration for an uplink transmission configuration indicator (TCI) state list;
use the default uplink beam for transmitting the PUSCH; and
deactivate the default uplink beam for the PUSCH in response to receipt of signaling that configures a single TCI state for a control resource set (CORESET) and with a field set to a value that indicates a TCI field is not present in a downlink control information (DCI).

16. An apparatus for wireless communications by a network entity, the apparatus comprising:
at least one processor and a memory configured to cause the apparatus to:
determine a default uplink beam for a user equipment (UE) to use for a physical uplink shared channel (PUSCH) before the network entity sends the UE a radio resource control (RRC) configuration for an uplink transmission configuration indicator (TCI) state list;
process transmissions from the UE sent on the PUSCH using the default uplink beam;
send signaling to the UE that configures a single TCI state for a control resource set (CORESET) and with a field set to a value that indicates a TCI field is not present in a downlink control information (DCI); and
deactivate the default uplink beam for the PUSCH in response to receipt, from the UE, of an acknowledgment of the signaling.

* * * * *